US009569527B2

(12) United States Patent
Riezler et al.

(10) Patent No.: US 9,569,527 B2
(45) Date of Patent: Feb. 14, 2017

(54) MACHINE TRANSLATION FOR QUERY EXPANSION

(75) Inventors: Stefan Riezler, Heidelberg (DE); Alexander L. Vasserman, Malden, MA (US)

(73) Assignee: Google Inc., Mountain View, CA (US)

(*) Notice: Subject to any disclaimer, the term of this patent is extended or adjusted under 35 U.S.C. 154(b) by 1064 days.

(21) Appl. No.: 13/618,337

(22) Filed: Sep. 14, 2012

(65) Prior Publication Data

US 2013/0031122 A1 Jan. 31, 2013

Related U.S. Application Data

(63) Continuation of application No. 12/050,022, filed on Mar. 17, 2008, now Pat. No. 9,002,869.

(60) Provisional application No. 60/945,903, filed on Jun. 22, 2007.

(51) Int. Cl.
*G06F 7/00* (2006.01)
*G06F 17/30* (2006.01)

(52) U.S. Cl.
CPC .............. *G06F 17/30672* (2013.01)

(58) Field of Classification Search
CPC ................................. G06F 17/30672
USPC ......................................... 707/736
See application file for complete search history.

(56) References Cited

U.S. PATENT DOCUMENTS

| 5,926,811 | A | 7/1999 | Miller et al. |
| 7,562,082 | B2 | 7/2009 | Zhou |
| 7,689,412 | B2 | 3/2010 | Wu et al. |
| 7,860,706 | B2 | 12/2010 | Abir |
| 2002/0194300 | A1 | 12/2002 | Lin et al. |
| 2003/0074353 | A1 | 4/2003 | Berkan et al. |
| 2003/0171910 | A1 | 9/2003 | Abir |
| 2003/0191626 | A1 | 10/2003 | Al-Onaizan et al. |
| 2004/0122656 | A1 | 6/2004 | Abir |
| 2004/0153311 | A1 | 8/2004 | Liu et al. |
| 2005/0080772 | A1 | 4/2005 | Bem |

(Continued)

FOREIGN PATENT DOCUMENTS

CN 1839386 9/2006

OTHER PUBLICATIONS

Chinese First Office Action dated Jul. 27, 2011 for Chinese Application No. 200880102717.X, 7 pages.

(Continued)

*Primary Examiner* — Kimberly Wilson
(74) *Attorney, Agent, or Firm* — Fish & Richardson P.C.

(57) ABSTRACT

Methods, systems and apparatus, including computer program products, for expanding search queries. One method includes receiving a search query, selecting a synonym of a term in the search query based on a context of occurrence of the term in the received search query, the synonym having been derived from statistical machine translation of the term, and expanding the received search query with the synonym and using the expanded search query to search a collection of documents. Alternatively, another method includes receiving a request to search a corpus of documents, the request specifying a search query, using statistical machine translation to translate the specified search query into an expanded search query, the specified search query and the expanded search query being in the same natural language, and in response to the request, using the expanded search query to search a collection of documents.

17 Claims, 7 Drawing Sheets

(56) References Cited

U.S. PATENT DOCUMENTS

| | | | |
|---|---|---|---|
| 2005/0222901 A1 | 10/2005 | Agarwal et al. | |
| 2005/0222976 A1 | 10/2005 | Pfleger | |
| 2006/0106595 A1 | 5/2006 | Brockett et al. | |
| 2006/0149625 A1 | 7/2006 | Koningstein | |
| 2006/0265209 A1 | 11/2006 | Bradford | |
| 2007/0011154 A1 | 1/2007 | Musgrove et al. | |
| 2007/0022134 A1 | 1/2007 | Zhou et al. | |
| 2007/0100811 A1 | 5/2007 | Error et al. | |
| 2007/0112840 A1 | 5/2007 | Carson et al. | |
| 2007/0124200 A1 | 5/2007 | Simons et al. | |
| 2007/0282594 A1* | 12/2007 | Spina | G06F 17/289 704/9 |
| 2008/0208841 A1 | 8/2008 | Zeng et al. | |
| 2008/0243481 A1 | 10/2008 | Brants et al. | |
| 2008/0256035 A1 | 10/2008 | Zhang et al. | |
| 2008/0319962 A1 | 12/2008 | Riezler et al. | |
| 2009/0024613 A1 | 1/2009 | Niu et al. | |
| 2009/0112840 A1 | 4/2009 | Murdock et al. | |
| 2009/0132233 A1 | 5/2009 | Etzioni et al. | |
| 2009/0177460 A1 | 7/2009 | Huang et al. | |
| 2009/0192782 A1 | 7/2009 | Drewes | |
| 2009/0216710 A1 | 8/2009 | Chang et al. | |
| 2009/0228353 A1 | 9/2009 | Achan et al. | |
| 2009/0248422 A1 | 10/2009 | Li et al. | |
| 2009/0248627 A1 | 10/2009 | Shahshahani et al. | |
| 2009/0248655 A1 | 10/2009 | Makeev | |
| 2009/0254512 A1 | 10/2009 | Broder et al. | |
| 2009/0265230 A1 | 10/2009 | Plachouras et al. | |
| 2009/0265290 A1 | 10/2009 | Ciaramita et al. | |
| 2010/0010895 A1 | 1/2010 | Gabrilovich et al. | |
| 2010/0017262 A1 | 1/2010 | Iyer et al. | |

OTHER PUBLICATIONS

Duboue et al., "Answering the Question You Wish They Had Asked: The Impact of Paraphrasing for Question Answering," Proceedings of the Human Language Technology Conference of the NAACL, Companion Volume: Short Papers (NAACL-SHORT '06), Jun. 5, 2006, pp. 33-36.

European Office Action dated Aug. 2, 2011 for European Application No. 08771627.0, 6 pages.

Jones et al., "Generating Query Substitutions," In: Proceedings of the 15th international conference on World Wide Web (2006). Available at: ACM, 10 pages.

International Search Report and Written Opinion mailed Dec. 10, 2008 from corresponding International Application No. PCT/US2008/067721.

Joshi et al., "Keyword Generation for Search Engine Advertising," In: Data Mining Workshops, 2006. ICDM Workshops 2006. Sixth IEEE International Conference on. Available at: IEEXplore, 5 pages.

Abhishek et al., "Keyword Generation for Search Engine Advertising using Semantic Similarity between Terms," In: Proceedings of the ninth international conference on Electronic commerce (Aug. 19-22, 2007). Available at: ACM, 6 pages.

Radlinski et al., "Optimizing Relevance and Revenue in Ad Search: A Query Substitution Approach," In: Proceedings of the 31st annual international ACM SIGIR conference on Research and development in information retrieval (Jul. 20-24, 2008). Available at: ACM, 8 pages.

Zhang et al., "Query Rewriting using Active Learning for Sponsored Search," In: Proceedings of the 30th annual international ACM SIGIR conference on Research and development in information retrieval (Jul. 23-27, 2007). Available at: ACM, 2 pages.

Riezler et al. "Statistical Machine Translation for Query Expansion in Answer Retrieval" In: ALC 2007 proceedings, Jun. 23, 2007. See the whole section and figures, downloaded from http://www.stefanriezler.com/PAPERS/CL07.pdf.

Riezler et al. "Translating Queries into Snippets for Improved Query Expansion" In: Proceedings of the $22^{nd}$ International Conference on Computational Linguistics (COLING'08), Manchester England, downloaded from http://www.stefanriezler.com/PAPERS/COLING08.pdf.

Supplementary European Search Report mailed Aug. 2, 2011 from corresponding European Application No. 08771627.0-2201, 4 pages.

Voorhees et al., "Vector Expansion in a Large Collection," NIST Special Publication Gaithersburg, MD, Mar. 1, 1993, pp. 343-351.

Voorhees et al., "Query Expansion using Lexical-Semantic Relations," SIGIR '94, Dublin, Jul. 3-6, 1994; Proceedings of the Annual International ACM-SIGIR Conference on Research and Development in Information Retrieval, Berlin, Springer, DE, Jul. 3, 1994, pp. 61-69.

Xu et al., "A Comparison of Local Analysis, Global Analysis and Ontology-based Query Expansion Strategies for Bio-medical Literature Search," Systems, Man and Cybernetics, 2006. ICSMC '06, IEEE International Conference on IEEE, PI, Oct. 1, 2006, pp. 3441-3446.

Zens et al. "Phrase-Based Statistical Machine Translation" In: Proc. German Conference on Artificial Intelligence, Sep. 30, 2002. See abstract, section 1-section 3.4 and figure 1.

Chinese Office Action issued Jun. 8, 2012 from related Chinese Patent Application No. 200880102717.X, 9 pages.

"Language Model Techniques in Machine Translation," by Raab, Martin. In: Universitat Karlsruhe (2006). Available at: http://titan.segv.dehmartin/publications/DiplomOnline.pdf.

"The Mathematics of Statistical Machine Translation: Parameter Estimation," by Brown et al. In: Comput. Linguist., 19(2): 263-311. Available at: ACM, 1993.

"Monolingual Machine Translation for Paraphrase Generation," by Quirk et al. In: Proc. MNLP, pp. 142-149 (2004). Available at: http://ac1.1dc.upenn.edu/ac12004/emnIp/pdf/Quirk.pdf.

"A Noisy-Channel Approach to Contextual Advertising," by Murdock et al. In: Proc. 1st International Workshop on Data Mining and Audience Intelligence for Advertising (2007). Available at: ACM.

\* cited by examiner

MACHINE TRANSLATION FOR QUERY EXPANSION

CROSS-REFERENCE TO RELATED APPLICATIONS

This application is a continuation of, and claims priority to, pending U.S. patent application Ser. No. 12/050,022, filed on Mar. 17, 2008, entitled "Machine Translation for Query Expansion," which claims the benefit of U.S. Provisional Patent Application No. 60/945,903, filed on Jun. 22, 2007, entitled "Machine Translation for Query Expansion." The entirety of the foregoing applications is herein incorporated by reference.

BACKGROUND

This specification relates to search query expansion.

Query expansion refers to modifying a search query received from a user before performing a search. Ideally, the modified search query will yield improved search results compared to the original query. Typical approaches to query expansion include stemming of words, correction of spelling errors, and augmentation of the search query, e.g., using synonyms of words that occur in the original query.

A number of approaches to query expansion using synonyms exist. For example, the synonyms of a word can be identified from an expert-specified thesaurus or a lexical ontology. In some systems synonyms are identified from other search queries that are syntactically similar to the original query. Synonym selection is particularly challenging when a word may have multiple potential synonyms, each with widely varying meanings. For example, in the query "How to ship a box", the word 'ship' can have synonyms e.g., 'boat' and 'send'. Expanding a query with a synonym that is inconsistent with the user's intended meaning can lead to the identification of irrelevant search results. For example, search results related to fishing trawlers are probably not relevant to shipping a box.

SUMMARY

Systems, methods, and computer program products are provided for search query expansion. In general, in one aspect, a method is provided. The method includes receiving a search query and selecting a synonym of a term in the search query based on a context of occurrence of the term in the received search query, the synonym having been derived from statistical machine translation of the term. The method also includes expanding the received search query with the synonym and using the expanded search query to search a collection of documents. Other embodiments of this aspect include corresponding systems, apparatus, and computer program products.

These and other embodiments can optionally include one or more of the following features. A plurality of recorded search queries can be identified wherein the term occurs in each of the recorded search queries. Statistical machine translation can be used to translate the plurality of recorded search queries into respective translated search queries. A plurality of potential synonyms can be identified from the translated search queries. A potential synonym can be one or more unique translations of the term among the translated search queries where each potential synonym has an associated context of occurrence. The synonym from the plurality of potential synonyms can be selected by matching the context of occurrence of the term in the received query with the context of occurrence of each potential synonym in the translated search query. The statistical machine translation can use bi-directional phrase alignments.

Question phrases and corresponding answer phrases can be identified from a plurality of documents. A translation model for the statistical machine translation can be built using the question phrases as a source language and the corresponding answer phrases as a target language. A first phrase in a first natural language can be identified. A second phrase in a second natural language can be generated by translating the first phrase into a second natural language. A paraphrase of the first phrase can be identified by translating the second phrase back into the first natural language. A translation model for the statistical machine translation can be built using the first phrase as a source language and the paraphrase as a corresponding target language.

A search result access log can be identified. Each record in the search result access log can identify a respective recorded search query and a corresponding snippet. The snippet of a respective recorded search query can be a portion of content from a document accessed by a user, where the document has been presented to the user as a search result in response to receiving the respective recorded search query. A translation model is built for the statistical machine translation using the search queries from the search result access log as a source language and the corresponding snippets as a target language. Records from the query log can be filtered based on respective information associated with each record. The respective information can be one or more of: a position of the document with respect to other documents presented as search results to the user, an amount of time elapsed between having provided the search result to the user and the user accessing the document, and an amount of time elapsed between the user having accessed the document and the user performing a subsequent operation. The portion of content from a document can be one or more of a title of the document, anchor terms associated with the document, and an excerpt of the document where the excerpt can contain terms from the respective recorded search query.

In general, in another aspect, a method is provided. The method includes receiving a request to search a corpus of documents, the request specifying a search query, using statistical machine translation to translate the specified search query into an expanded search query, the specified search query and the expanded search query being in the same natural language, and in response to the request, using the expanded search query to search a collection of documents. Other embodiments of this aspect include corresponding systems, apparatus, and computer program products.

Particular embodiments can be implemented to realize one or more of the following advantages. A search query can be expanded with words that are synonyms identified for the search query, thus increasing the likelihood that relevant results can be provided in response to the search query. In some implementations, only synonyms that are relevant given the context of a given search query are used in the expansion, thus avoiding expansion of the query with inappropriate words. Synonyms for query expansion can be selected from a corpus of documents that are based on the search results selected by other users using similar search queries. Such expansion generates an expanded query that can be used to identify more relevant (e.g., satisfying the query according to some rules), precise search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
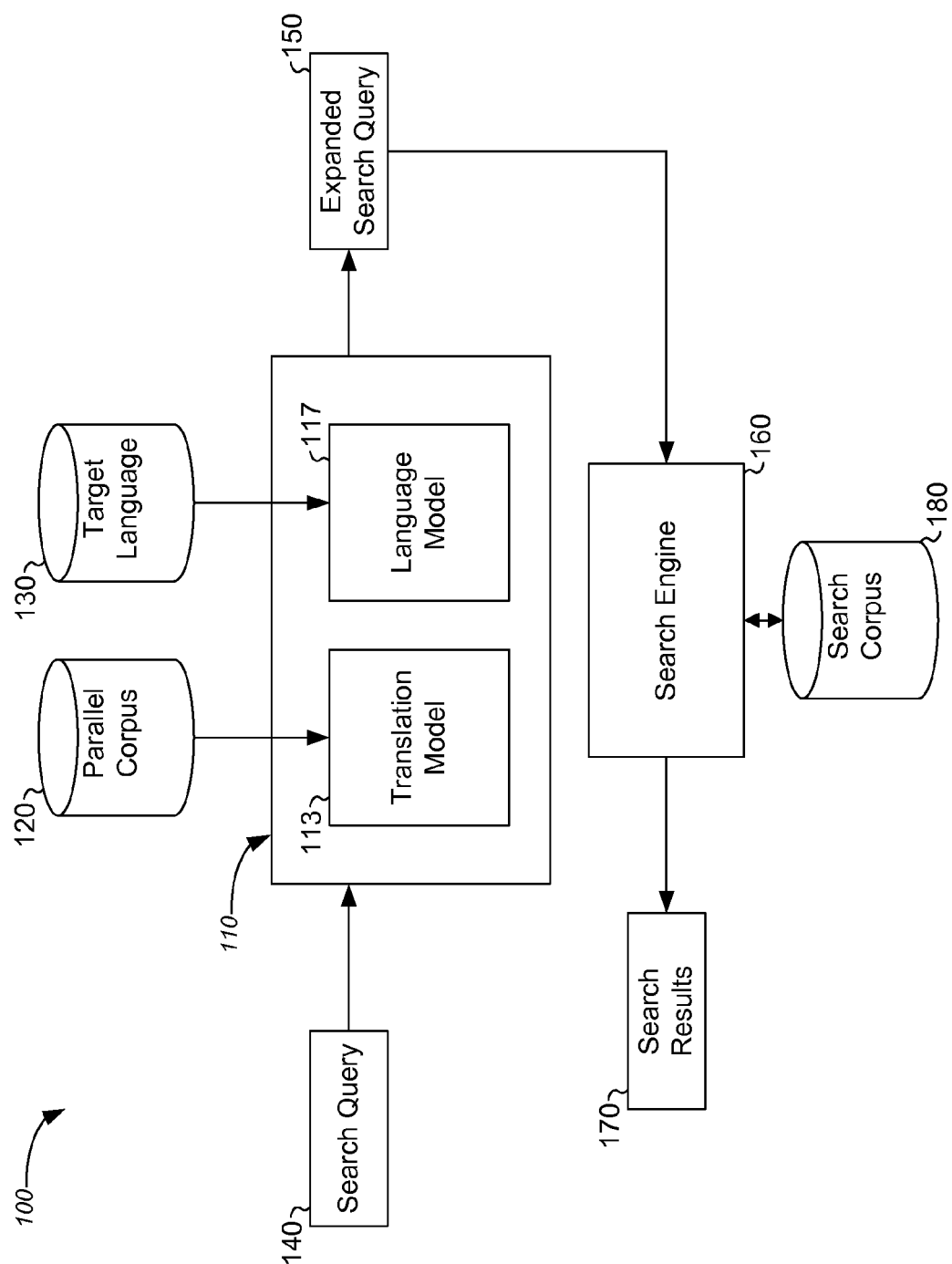
FIG. 1 is a diagram of an example statistical machine translation system.

FIG. 1 is a diagram of an example statistical machine translation system 100. Statistical machine translation system 100 is used to translate a sequence of input words in a source language to a sequence of translated words in a target language. Statistical machine translation depends on statistical models that are based on prior probabilities and statistical correlations between the occurrences of words in training corpora. Conventional applications of statistical machine translation assume that both the source and target languages are distinct natural languages (e.g., French, English, German, or Arabic). In principle, however, the natural languages used as input and provided as output need not be distinct.

The statistical machine translation system 100 includes two distinct models: a language model 117 and a translation model 113. The language model 117 is used in machine translation to determine whether a passage of text is likely to be in the target language (e.g., using probabilities associated with the target language). The translation model 113 is used to derive potential translations in the target language given input text in the source language (e.g., using probabilities that the given source language text corresponds to a target language text). When a passage of text is received, both models are used to effect statistical machine translation of the passage. The language model 117 is used to determine which of the potential translations proposed by the translation model are most reasonable based on the likelihood that any of the potential translations would appear in the target language. Thus, a translation of the passage of text is one that is both predicted by the translation model 113 and likely to be in the target language according to the language model 117. Both models together can be said to constitute a statistical machine translation model 110.

Before the statistical machine translation model 110 can be used to translate passages of text, both the language model 117 and the translation model 113 are trained from sample data (e.g., sample text). The sample text is used as exemplary data from which both the language model 117 and translation model 113 are derived. For example, the language model 113 can be trained using a language corpus 130 of sample text in the target language. Similarly, the translation model 117 can be trained using a corpus of parallel text 120, which includes sample text of both the source and target languages. In the corpus of parallel text 120, for a given passage of text in the source language, a corresponding passage of text in the target language is provided that is presumed to be a translation of the given passage in the source language.

Statistical correlations between the occurrences of words in the source language and words in the target language are expressed as alignments between particular words or phrases. When the target language and source language are the same natural language, the principal meaning of an aligned pair is the same. The aligned word or phrase pair is presumed to have similar meaning, i.e., they are presumed to be synonymous. For example, the word "ship" can be aligned under certain circumstances (e.g., in a particular context) with the word "transport". Thus, for those circumstances, "ship" is synonymous with "transport".

The statistical machine translation model 110 is used to translate a received search query 140 into a translated search query. Each received search query 140 includes text that describes content that an information seeker desires to retrieve from a search corpus 180. Ideally, the translation of the received search query 140 identifies synonyms that are not provided in the received search query but which improve search results responsive to the query, for example, when the received search query 140 and an expanded search query 150, which is derived using the synonyms, have substantially equal meanings.

In some implementations, the translated query is used as the expanded search query 150. In other implementations, the translated search query is used to expand the received search query 140 into the expanded search query 150. Expanding the received search query 140 can include adding words that occur in the translated search query, but do not occur in the received query 140. The expanded search query 150 is used to search the search corpus 180. Searching the search corpus 180 is facilitated by a search engine 160. Searching the search corpus 180 yields search results 170 that can be provided to the information seeker in response to the received search query 140.

The search engine 160 can be part of a search system implemented as, for example, computer programs running on one or more computers in one or more locations that are coupled to each other through a network. The search engine 160 responds to the query by generating search results, for example, results identifying the locations in the repository corresponding to the query.

When the query is received by the search engine 160, the search engine 160 uses information retrieval techniques to identify relevant resources (e.g., documents in a source collection). The search engine 160 will generally include a ranking engine (or other software) to rank the resources related to the query. The ranking of the resources can be performed using conventional techniques for determining an information retrieval score for indexed resources in view of a given query. The relevance of a particular resource with respect to a particular query term or to other provided information may be determined by any appropriate technique.

For the purposes of the following discussion, any convenient statistical machine translation implementation can be used to translate text. In some implementations, one or more of the following features of the statistical machine translation implementation can be configured to improve the efficacy of synonym selection. For example, the training corpus can be preprocessed to remove extraneous information e.g., punctuation or formatting tags (e.g., hyper-text markup language (HTML) tags from a corpus derived from web pages). In some implementations, sentence and chunk alignment, word alignment and phrase extraction are configured according to conventional practices.

In some implementations, a statistical machine translation model derived for query expansion favors the identification of strong associations between synonymous words rather than the generation of fluent translated phrases. Generally, fewer alignments between highly likely synonyms are preferred to many alignments between marginally likely synonyms. Thus, the statistical machine translation implementation can be configured to identify only highly likely alignments between a target phrase and a source phrase. For example, the statistical machine translation implementation can be configured to align phrases only if the alignment applies to both translation directions—such alignments are likely to be accurate. Thus, if an alignment indicates that a first phrase translates to a second phrase, but that the second phrase translates to a third phrase (rather than back to the first phrase), the alignment can be omitted in the translation model.

One parameter of configuration for a statistical machine translation implementation is a null-word probability. For a given word pair, the null-word probability is used by the statistical machine translation model to determine what proportion of words in the source text are allowed to be unmapped to words in the target text. For a corpus of parallel text, the source language phrases can have significantly fewer words than corresponding target language phrases. This is particularly true for question-answer pairs, as described below. In such cases, the null-word probability of the implementation can be set to be relatively high. For example, when a translation model is built from a parallel corpus of question-answer pairs where an answer is generally much longer than its corresponding question, the null-word probability can be set to a value of 90%.

An expectation-maximization ("EM") technique can be used to estimate parameter values and alignment probabilities using an iterative process until local optimum values are determined. An EM technique calculates maximum likelihood estimates of variables in probabilistic models. An EM technique is a two-step process. An expectation step calculates an expectation of the likelihood by including the variable values as if they were observed. A maximization step calculates the maximum likelihood estimates by maximizing the expected likelihood calculated in the expectation step. The process iterates between expectation and maximization steps where the values for the variable calculated in the maximization step are used for a next expectation step. The term "EM technique" refers to a class of related technique: the expectation and maximization steps provide a roadmap for developing specific EM technique. In some implementations, other techniques are used to find maximum likelihood estimates other than the EM technique, for example, gradient descent or conjugate gradient techniques.

Using a technique such as an EM technique, the translation model 113 is trained to determine the most likely parameter values and alignments.

The following discussion describes three distinct approaches for training a statistical machine translation model. In the first two approaches, translated search queries are derived from text that is representative of the results that would be provided in response to the search query. In other words, a translation model is trained on a parallel corpus of text that includes queries (the source language) and corresponding search results (the target language). Ideally, the query samples are representative of the search queries that are likely to be received and translated by the statistical machine translation model 110. Similarly, the corresponding search results are representative of results that would be responsive to the respective sample query.

In the first approach, the translation model is trained on question-answer pairs. For each question-answer pair, a question represents a query and its corresponding answer represents a relevant result. Question-answer pairs can be identified, for example, from the content of frequently asked question (FAQ) documents. Such documents typically include a series of questions and for each question a respective answer. In general, any document can be analyzed to determine whether contents of the document include questions and answers that can be incorporated into a question-answer parallel corpus. Further details about how questions and answers are identified from a document are described below in reference to FIG. 2

In the second approach, the translation model can be trained on query-snippet pairs. Each query-answer pair represents a search query and content of corresponding search results responsive to the search query. For example, the search queries received from users of an information retrieval system, e.g., a search engine, can be recorded and stored. For each of these stored search queries, the search results presented to a user in response to receiving the search query can also be stored. In some implementations, the system can further identify which of the presented search results were accessed by the user (e.g., which document was retrieved by the user). Those search results that have been accessed by a user are search results that are likely to have been particularly relevant to the corresponding search query. Portions of content from the document (e.g., snippets) identified by each search result can be paired with the search query to form a query-snippet pair that is added to a query-snippet parallel corpus. Further details about how a parallel corpus is derived from a record of search queries are described below in reference to FIG. 3.

In the third approach, the translation model can be trained on synonymous phrase-paraphrase pairs. Each phrase-paraphrase pair includes a phrase and a corresponding paraphrase, which has approximately the same meaning as its corresponding phrase. In some implementations, phrase-paraphrase pairs can be manually specified (e.g., by a language expert). In other implementations, phrases are initially identified automatically from a corpus of text. A phrase from the corpus, which is of a first natural language, is selected and translated into another phrase in a second, distinct, natural language. This translation can be achieved using any convenient fully or semi-automated machine translation technique. The phrase in the second natural language is then translated back to the first natural language. Each double-translated phrase generated by this process is presumed to be a synonymous paraphrase of the original input phrase. Further details about how a parallel corpus is derived from such translation are described below in reference to FIG. 4.

The target language corpus 130 used to train the language model 117 can vary. In some implementations, this corpus is simply a sample of content from the search corpus 180. For example, for an Internet search engine, the language model can be trained using content in the corpus of web pages that have been retrieved and cataloged by the search engine. Alternatively, in some other implementations, the language model is trained using recorded search queries.

Figure 2:
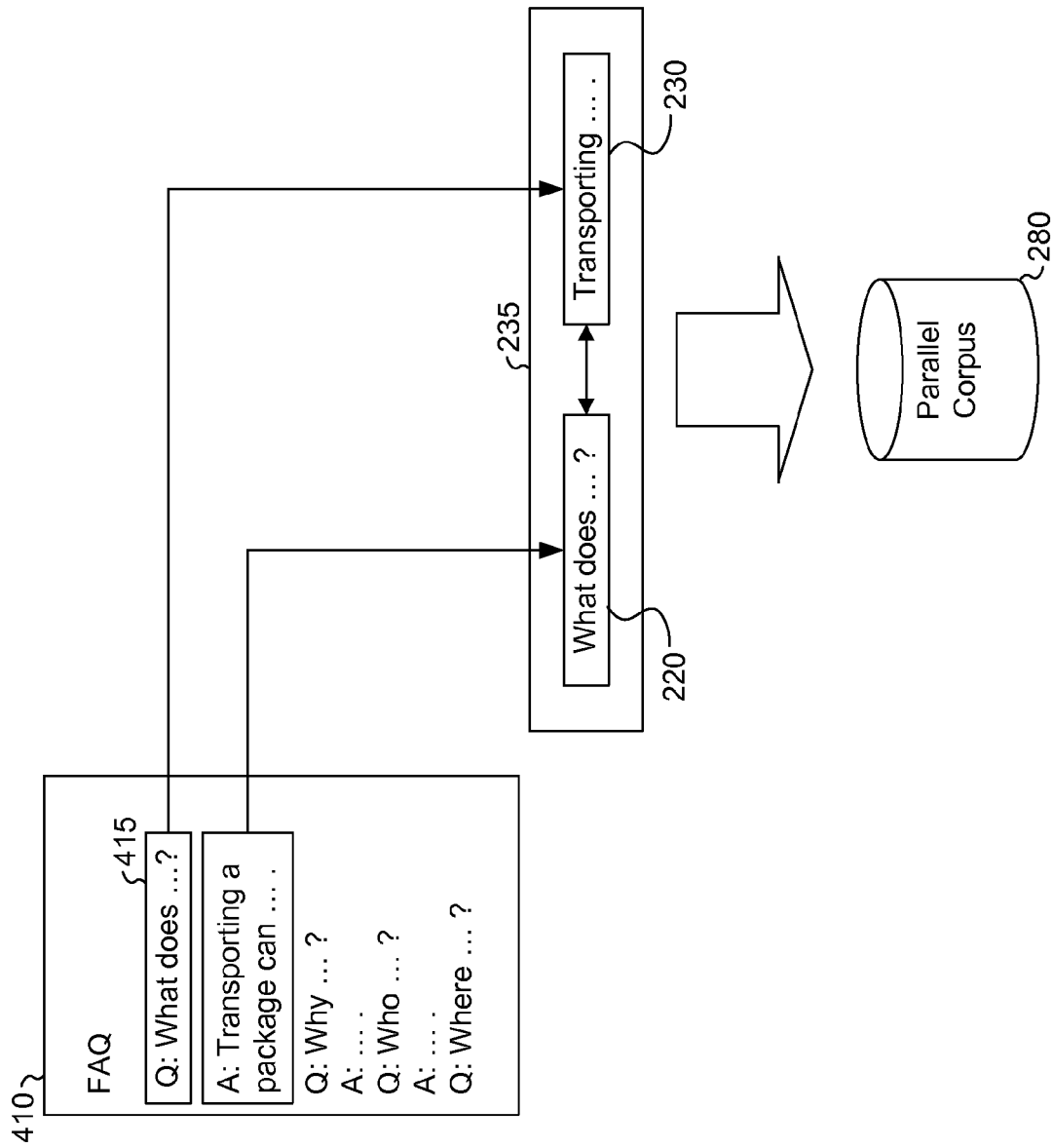
FIG. 2 shows an example of a question-answer pair being derived from a document.

FIG. 2 shows an example of a question-answer pair 235 being derived from a document 210. Documents that are likely to include questions and answers can be identified based on terms that are likely to appear in such documents.

For example, among documents found on the Internet, the keywords "FAQ" or "Frequently Asked Questions" appear frequently on web pages that feature a series of questions and corresponding answers. Such keywords can be used to first identify a collection of documents that potentially contain questions and answers. In some implementations, a classifier is trained to identify pages in a corpus of documents. Such a classifier can be trained by an expert user, who, for example, specifies features that are common to question-answer documents (e.g., keywords including the five 'wh-words' (who, what, why, when, and where) or the occurrences of question marks and other punctuation within the document). The classifier can be used on a corpus of document to identify which are likely to contain questions and answers.

When the collection of potential question-answer documents have been identified, individual question-answer pairs are extracted from the documents. Questions and their corresponding answers can be extracted based on punctuation (e.g., question marks delimiting the end of questions), formatting identifiers (e.g., paragraph breaks between questions and answers), listing markers (e.g., question sequence identifiers such as 'Q:' or '1:') and lexical cues (e.g., initially capitalized wh-words for delimiting the beginning of questions).

For each question specified in the content of a document 210, the question text 230 and the question's corresponding answer text 220 is extracted from the document. The question text 230 and answer text 220 represent a question-answer pair 235 that is added to the parallel corpus. All documents in the collection can be similarly processed to derive the question-answer pairs in the parallel corpus 240.

Figure 3:
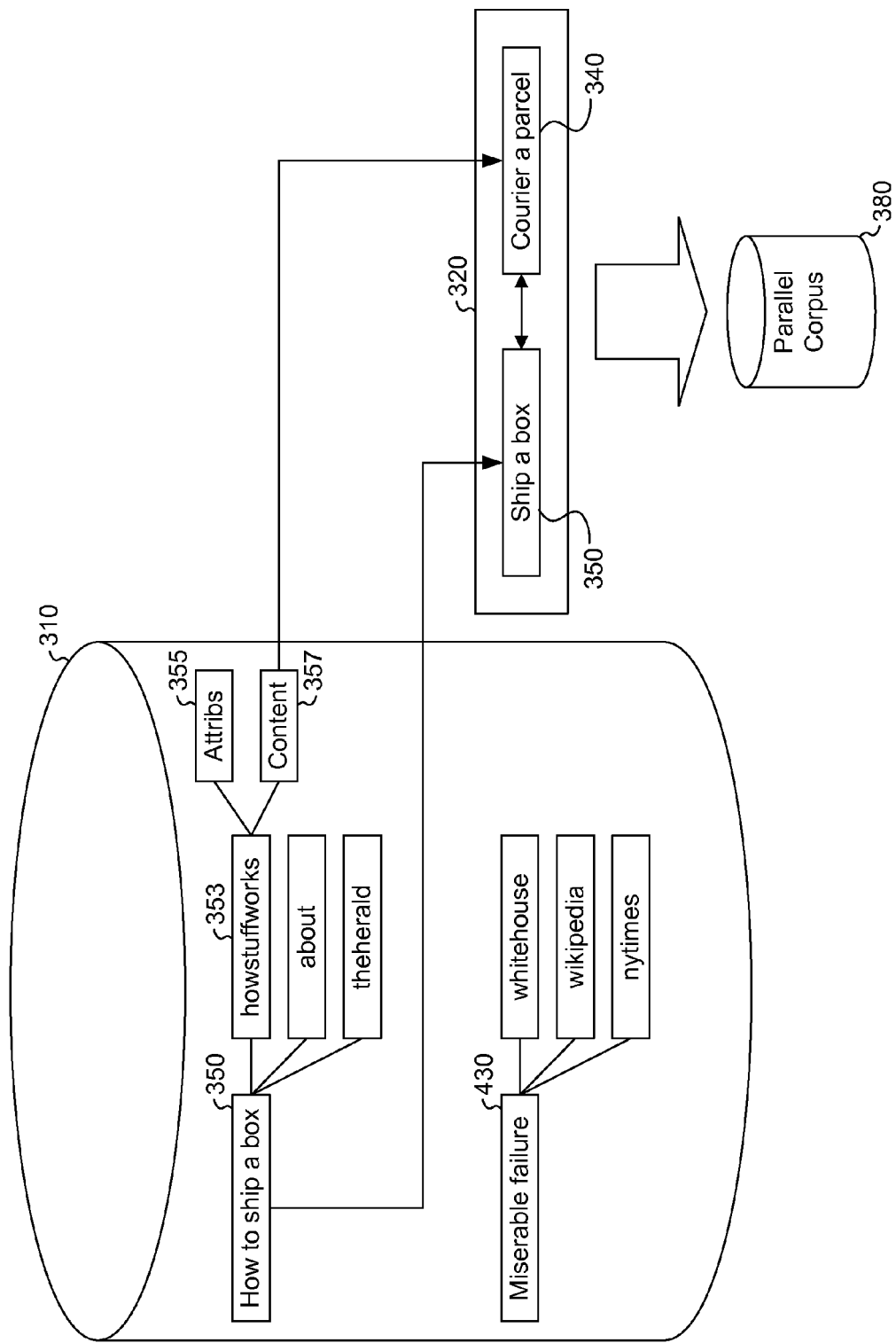
FIG. 3 shows an example of query-snippet pairs being derived from a query log.

FIG. 3 shows an example of query-snippet pairs being derived from a query log 310. The query log 310 includes recorded search queries 350. For each recorded search query 350, corresponding search results 353 are also identified in the query log 310. Each search result of the search results 353 identifies a document containing text. Each document can correspond to a file, a web page, a record in a database, or some other content container. The search results 353 recorded in the log 310 are those results that were most likely to have been relevant to the search query 350.

In some implementations, additional information is used to determine which of the search results presented in response to a search query were most relevant. For example, the search results that were examined by a user (e.g., based on click or document access records) can be considered search results that were determined to be relevant to the search query 350.

Each search result 353 is associated with content 357 from a document identified by the search result 353. In some implementations, the content 357 is the text of a document identified by the search result 353. In some implementations, the content 357 includes a location identifier (e.g., a universal resource locator (URL) or file/path name from where the content 357 can be found). In other implementations, the content 357 includes text that is used by other documents to refer to the document (e.g., anchor text used in a web page to refer to the document identified by the search result 353).

In some implementations, each search result 353 is associated with attributes 355 that describe characteristics of the search results 353 at the time that each search result was presented in response to a corresponding search query 350. An order attribute, for example, describes what position a particular search result was presented relative to other search results. For example, the order of a search result can be five, indicating that the search result was fifth among the search results presented in response to the search query 350. In some implementations, a length-of-access attribute describes the length of time that a user accessed a given document identified by a particular search result. The attributes can also include information about when the search result was accessed by a user compared to when the search result was provided to the user (or, alternatively, compared to when the search query was received). For example, an attribute can specify that a given search result was accessed by a user 25 seconds after the user submitted the search query 350 or was presented with search results in response to the search query 350.

The attributes 355 of the search results can be used to filter queries 350 and corresponding search results 353 from the log 310. The filtering can be used to remove any search results whose relevance does not exceed a specified threshold. The relevance of search results can be measured by specifying conditions for any given attributes. Conditions can be specified that cause search results satisfying the condition to be omitted.

In some implementations, the condition is a specified threshold. For example, only search results that appeared lower than the fifth search result are used. In some implementations, this rule is effective when top-most (e.g., top five) results are likely to have been accessed by a user. Alternatively, all search results where the user accessed the result for less than ten seconds can be omitted. Other conditions, for either selecting or omitting search results, can be specified based on the attributes available.

For each pair of recorded search queries 350 and corresponding search results 353, a query-snippet pair 320 is derived. The query-snippet pair 320 includes the recorded search query 350 and a corresponding snippet 340. The snippet 340 is derived from the search result 353 and, in particular, the content 357 that the search result identifies. In some implementations, the snippet 340 is a string of text extracted from the content 357.

The string of text can include words that are relevant to the given search query 350. For example, the string of text can include sentences, or portions thereof, that occur in the content 357 and that include any of the words occurring in the search query 350. The snippet 340 can also include other content, for example, a title associated with the content, a location identifier of the content, or the anchor text used to refer to the content in other documents. Thus, for any given search query, multiple query-snippet pairs 320 can be derived from each of the search results recorded in the log 310. Each query-snippet pair 320 derived from the log 310 is added to the parallel corpus of query-snippet pairs 380 for use in training a translation model (e.g., translation model 113 of FIG. 1).

Figure 4:
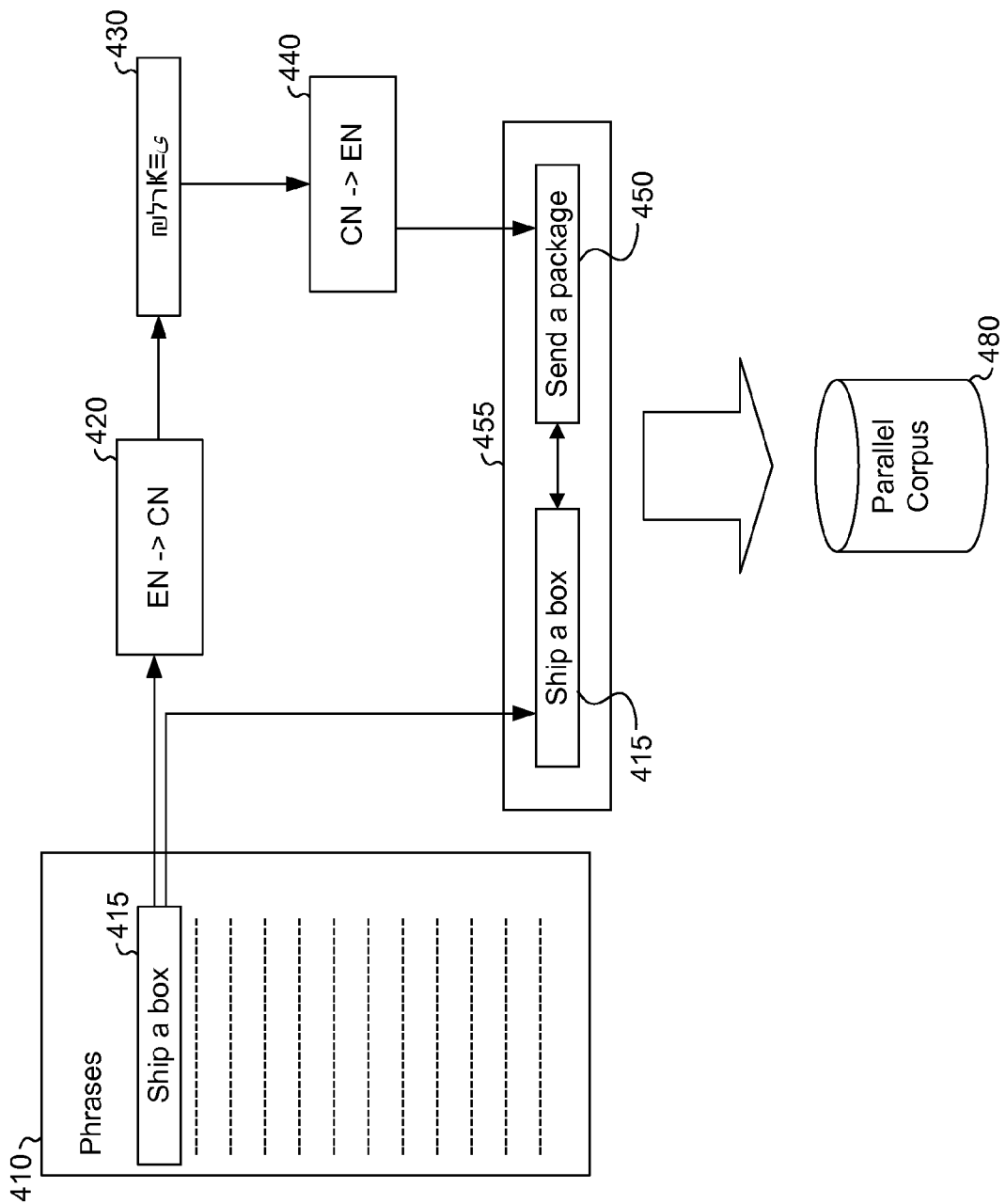
FIG. 4 shows an example of phrase-paraphrase pairs being derived from a phrase collection.

FIG. 4 shows an example of phrase-paraphrase pairs 455 being derived from a phrase collection 410. The phrase collection 410 is a collection of individual phrases in a first natural language, which is the same natural language as the search corpus. In some implementations, these phrases are identified automatically from the content of a corpus of documents. In other implementations, phrases, or even phrase-paraphrase pairs, can be specified by language experts.

An input phrase 415 in the collection 410 is translated into a second, distinct, natural language. The translation can be performed by a first translation component 420 that translates text of the first natural language to text of the second natural language (e.g., for translating English into Chinese). The first translation component 420 can be any convenient means of translation including translation by a language expect or using machine translation. The result of the translation is a translated phrase 430 in the second natural language. The translated phrase 430, being a translation of the input phrase 415, is presumed to have similar meaning to the input phrase 415.

The translated phrase is translated again by a second translation component 440 for translating text of the second natural language to text of the first natural language (e.g., for translating Chinese back into English). The resultant double-translated phrase is a phrase in the same natural language as the input phrase 415 and is presumed to have similar meaning as the translated phrase 430. By association, the double-translated phrase is presumed to be a synonymous paraphrase 450 of the input phrase 415.

When a phrase in one language is derived from another string in the same language by translating through a given foreign language, the derived string can be referred to as being obtained by pivoting on the foreign language. The derived paraphrase 450 and the input phrase 415 are used as a phrase-paraphrase pair 455 and added to a parallel corpus 480.

Given a particular phrase-paraphrase pair, such as the phrase-paraphrase pair 455, the likelihood that the input phrase 415 translates into the paraphrase 450 is defined as the joint likelihood that the input phrase 415 translates into the translated phrase 430 and the translated phrase 430 translates into the paraphrase 450. In some implementations, both events are presumed to be independently likely, and thus can be expressed as:

$$p(para \mid in) = \max_{trans} p(trans \mid in) p(para \mid trans)$$

$$p(in \mid para) = \max_{trans} p(trans \mid para) p(in \mid trans).$$

Here, an input phrase is denoted as in, the paraphrase denoted as para and the translated phrase denoted as trans. In general, a given phrase-paraphrase pair can be obtained by pivoting on multiple foreign languages. The translation likelihood of a pair can be derived from translations of the pair in each pivot language. In some implementations, the translation likelihood of a phrase-paraphrase pair can be assigned a sum of all translation likelihoods for the pair in all foreign languages. This, however, may assign inordinately high probability to phrase-paraphrase pairs that occur in many languages. In other implementations, a pair's translation likelihood is the maximum translation likelihood of any of the foreign languages.

Figure 5:
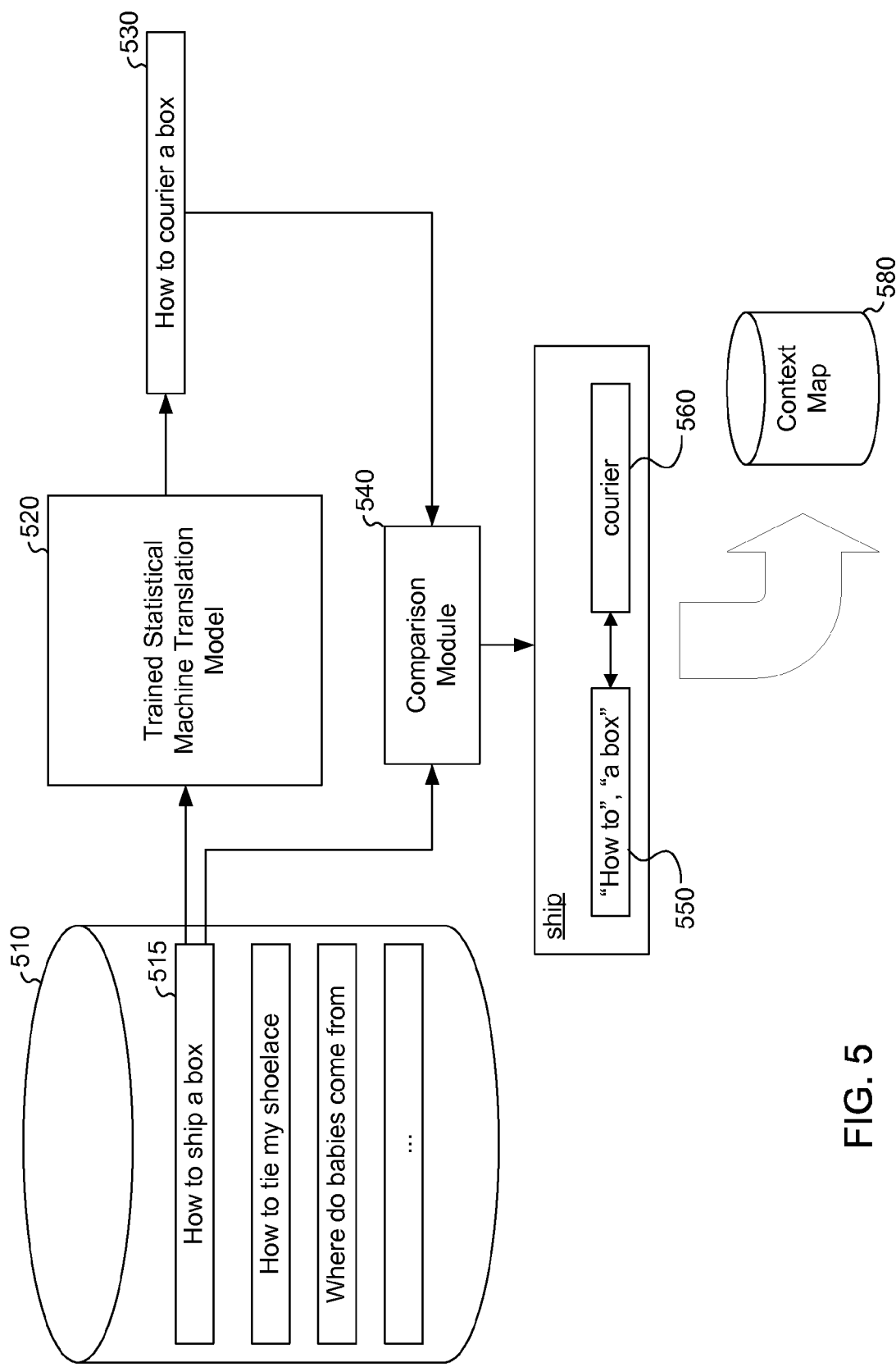
FIG. 5 shows an example derivation of a context map using a statistical machine translation model.

FIG. 5 shows an example derivation of a context map 580 using a statistical machine translation model 520. In some implementations, when a search query is received, the statistical machine translation model 520 is used translate the search query into an expanded search query. Such an implementation can be described as synchronous on-line translation, since the model 520 is used to translate each search query as it is received.

In other implementations, pre-existing search queries are translated into corresponding pre-existing translations using the statistical machine translation model 520. These pre-existing translations can be recorded in a context map 580. Later, a new search query can be expanded based on pre-existing translations in the context map 580. Such an implementation can be described as asynchronous off-line translation, because the pre-existing search queries are translated first and only later are search queries expanded using the results of the translation process. This off-line approach can be more efficient than the on-line approach when statistical machine translation requires relatively more resources. Since expansion is based on the pre-existing translations determined by the statistical machine translation model 520, the expansion of a query is still ultimately based on the synonyms identified by the statistical machine translation model 520.

A query log 510 is identified that includes search queries 515. The search queries 515 are representative of search queries that are likely to, at a later time, be received and expanded. In some implementations, the query log 310 is a record of search queries received from a search engine (e.g., the search engine 160 shown in FIG. 1). Search queries 515 from the query log 510 are used as input on a statistical machine learning model 520, which can be derived from the training approaches discussed above.

Each input search query translated by the statistical translation model 520 yields a corresponding translation 530 of the input search query. Each translated search query has potentially been expanded by the translation performed by the statistical machine translation model 520. For example, translation of search query "how to become a mason" can yield the translated search query "how to be a bricklayer".

A comparison module 540 compares the input search query with the translated search query to determine what synonyms, if any, have been used in the translation. In some implementations, the comparison module 540 compares, word-for-word, the input query with the translated query to determine what words have been replaced in the translation. Any word that differs in the translated search query is identified as a synonym 560 of the corresponding word in the input search query.

A synonym (either a single word or a synonym phrase) can replace any single word in the original word. For example, from a comparison of the above example search queries it can be determined that the word 'mason' is replaced in the translation by the word 'bricklayer' and that the word 'become' is replaced by the phrase 'be'.

Any number of words can occur to the left or the right of a replaced word in the original query. These words are recognized as the context 550 of the synonym replacement. Thus, the replaced word is exchanged for a particular synonym given the context of the replaced word within the input search query. These left and right words are stored with the synonym as left and right contexts in the context map 580. For example, from the above example comparison, the word 'mason', its synonym 'bricklayer', and left context 'how to become a' is added to the context map. The word 'become', its synonym 'be', left context 'how to' and right context 'a mason' is also added to the context map.

After processing search queries in the query log 510, the context map contains multiple target words. Each of the target words are words that, for at least one of the recorded search queries, have been replaced with a synonym by the machine translation model. Each target word is associated with at least one synonym and each synonym is associated with a respective left and right context. In some implementations, any one synonym may be associated with multiple left and right contexts which are all unique from the left and right contexts of other synonyms of the same target word.

In some implementations, for any given word in the context map 580, each potential synonym, having an associated context, is associated with a score. The score of a potential synonym represents the likelihood that a given synonym is an appropriate expansion of the word in the given context. The score is derived from the translation likelihood given by the machine translation model when the recorded search query was translated. The translation likelihood is a measure of how likely output text is a translation of input text. Generally, the translation likelihood includes a language probability in combination with a translation probability, as predicted by the statistical machine translation model.

The score of a synonym can be used when selecting which of multiple synonyms to use for expanding a query. For example, a particular context map can include the word 'tie' associated with the synonyms 'knot' and 'windsor', where the context of both synonyms is the same (e.g., 'how to tie a'). When using the context map to expand the string "how to tie a tie" the synonym 'knot' is used rather than the synonym 'windsor' because 'knot' is associated with a score higher than that of the synonym 'windsor'.

Figure 6:
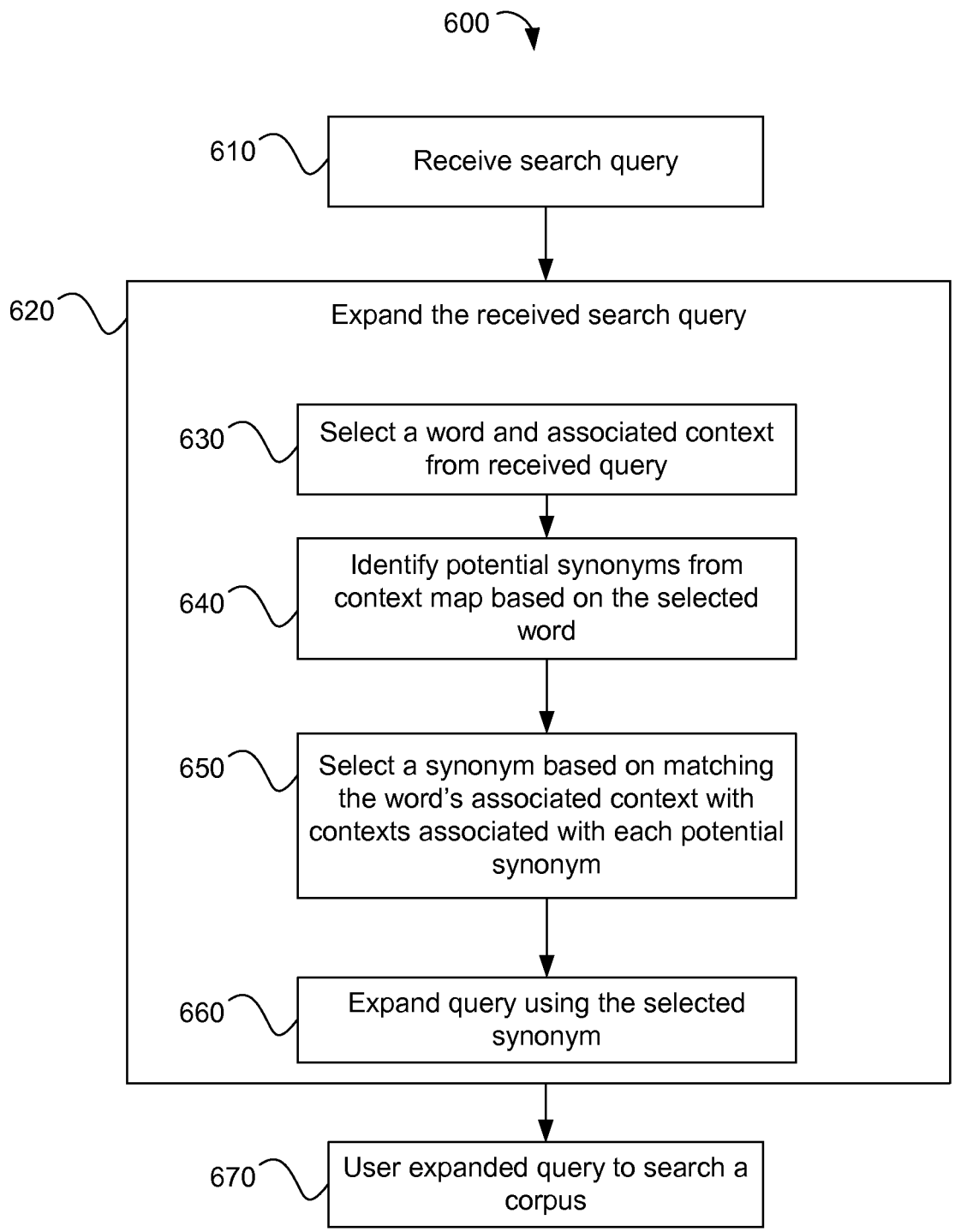
FIG. 6 is an example process for using statistical machine translation for expanding search queries.

FIG. 6 is an example process 600 for using statistical machine translation for expanding search queries. For convenience, the process 600 will be described with reference to a system that performs the process 600. The system receives a search query (step 610). The search query can be provided by a user seeking information from a search engine (e.g., the search engine 160 in FIG. 1). In other implementations, the search query is received from another process or application wherein the search query has been derived programmatically.

The system 600 expands the received search query (step 620). In particular, using a context map, (e.g., the context map 580 of FIG. 5), the system can expand the search query according to identified synonyms for the words occurring in the search query.

In some implementations, the system selects a word occurring in the received search query (step 630). The system identifies potential synonyms from the context map based on the selected word (step 640). In the context map, the selected word is associated with several synonyms each having respective contexts. Each synonym of the context map is derived, for example, using statistical machine translation. The system selects one of the several synonyms based on the context associated with the synonyms and the context of the selected word in the received search query (step 650). The synonym that has a context matching that of the selected word is used to expand the search query.

In particular, the system identifies a particular synonym based on whether the left or right context of the synonym matches the left or right context of the selected word. For example for a query "how to tie a bow", the left and right context of the word 'tie' in the query is "how to" and "a bow", respectively. In the context map, the word tie may be associated with two synonyms, 'equal' and 'knot'. If "how to" or "a bow" is a left or right context associated with 'knot', then 'knot' is selected as a synonym for 'tie'. In some implementations, the two contexts are considered matching if some proportion of words in the contexts are the same. For example, a left context matches another left context if the last two words of both contexts are the same. Similarly, a right context and another right context match if the first two words of both contexts are the same. In some implementations, when the contexts of multiple synonyms match or partially match the context of the word being expanded in the query, the synonym with the longest context is selected.

The system uses the identified synonym to expand the search query by adding the synonym to the query (step 660). A search query is expanded by augmenting the received search query with the synonym. In some implementations, the synonym is simply appended to the query. In other implementations, search query is reformulated so that the word being expanded and the synonym are combined in a logical disjunction (e.g., inclusive OR). For example, the query "how to be a mason" is expanded to "how to (be or become) a (mason or bricklayer)". The expanded search query is used to search a search corpus (step 670). Search results identifying particular resources (e.g., web pages, images, text documents, processes, multimedia content) that are responsive to the expanded search query can subsequently be returned (e.g., to a user).

Alternatively, as discussed above, statistical machine translation can be used (e.g., at step 620) using an on-line approach. In this approach, a search query is directly translated into a corresponding translated search query. The translated search query and the search query can be compared to identify synonyms that were used in the translation. The system uses these synonyms to expand the search query. The expanded search query is used to search the search corpus (step 670).

Figure 7:
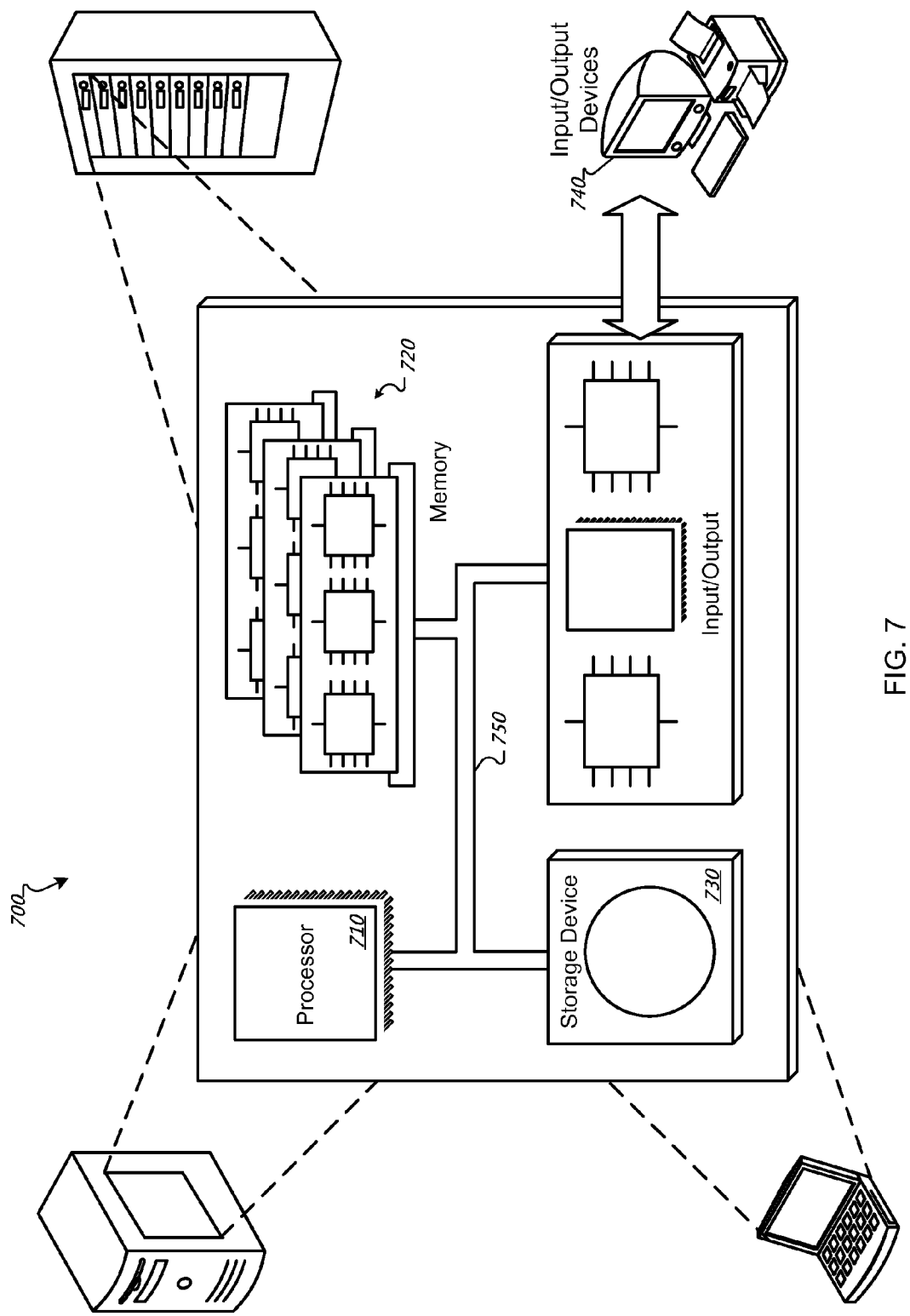
FIG. 7 is a block diagram of an example system.

FIG. 7 shows a block diagram of an example system 700 suitable for implementing apparatus or performing methods of various aspects of the subject matter described in this specification. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. In one implementation, the processor 710 is a single threaded processor. In another implementation, the processor 710 is a multi-threaded processor. The processor 710 is capable of processing instructions stored in the memory 720 or on the storage device 730 to display graphical information for a user interface on the input/output device 740.

The memory 720 is a computer readable medium such as volatile or non volatile that stores information within the system 700. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying a plurality of documents having one or more questions and, for each question, a corresponding answer;
   generating a plurality of question-answer pairs from the questions and respective corresponding answers occurring in the plurality of documents;
   training a statistical machine translation model using the plurality of question-answer pairs, including using each question of each question-answer pair as a source language input and a corresponding answer of the question-answer pair as a target language input, wherein each question and each corresponding answer are in the same natural language;
   translating, using the statistical machine translation model trained on the plurality of question-answer pairs, a phrase into one or more corresponding translated phrases; and determining one or more synonym pairs by comparing the phrase with the one or more corresponding translated phrases.

2. The method of claim 1, wherein determining one or more synonym pairs by comparing the phrase with the one or more corresponding translated phrases comprises determining that a term in a particular phrase is different from a corresponding translated term in a particular translated phrase.

3. The method of claim 1, wherein determining one or more synonym pairs comprises:
   computing a translation likelihood for a phrase and a corresponding translated phrase;
   generating a synonym pair from a term in the phrase and a corresponding translated term in the corresponding translated phrase;
   assigning a score to the synonym pair, wherein the score is derived from the translation likelihood of the phrase and the corresponding translated phrase; and
   determining that the term and the corresponding translated term are synonyms using the assigned score of the synonym pair.

4. The method of claim 3, where each phrase is a search query from a query log.

5. The method of claim 1, further comprising:
   receiving an initial search query including one or more terms;
   determining that a first term in the search query occurs in a synonym pair of the one or more synonym pairs;
   in response to determining that the first term in the search query occurs in a synonym pair of the one or more synonym pairs, generating an expanded search query that includes a second term of the synonym pair;
   obtaining search results using the expanded search query to search a collection of documents; and
   providing the search results in response to the initial search query.

6. The method of claim 1, further comprising:
   extracting question text and corresponding answer text from each document;
   adding the question text and answer text to a parallel corpus; and
   training the statistical machine translation model using the plurality of question-answer pairs in the parallel corpus.

7. The method of claim 1, further comprising:
   training a classifier to identify documents having one or more questions and corresponding answers, wherein identifying the plurality of documents having one or more questions and, for each question, a corresponding answer comprises using the trained classifier to identify documents having one or more questions and corresponding answers.

8. A computer-implemented method comprising:
   identifying a plurality of queries in a query log, and for each query, one or more search results associated with the query, wherein each search result identifies a corresponding resource and comprises a search result snippet that includes text from the corresponding resource identified by the search result;
   generating a plurality of query-snippet pairs, wherein each pair associates a respective query of the plurality of queries with a particular search result snippet from one of the search results associated with the query in the query log;
   training a statistical machine translation model using the plurality of query-snippet pairs, including using each query of each query-snippet pair as a source language input, and a corresponding snippet of the query-snippet pair as a target language input, wherein each query and the search result snippet of each query-snippet pair are in the same natural language;
   translating, using the statistical machine translation model trained on the plurality of query-snippet pairs and search result snippet pairs, a phrase into one or more corresponding translated phrases; and
   determining one or more synonym pairs including comparing the phrase with the one or more corresponding translated phrases.

9. The method of claim 8, wherein determining one or more synonym pairs by comparing the phrase with the one or more corresponding translated phrases comprises determining that a term in a particular phrase is different from a corresponding translated term in a particular translated phrase.

10. The method of claim 8, wherein determining one or more synonym pairs comprises:
    computing a translation likelihood for a phrase and a corresponding translated phrase;
    generating a synonym pair from a term in the phrase and a corresponding translated term in the corresponding translated phrase;
    assigning a score to the synonym pair, wherein the score is derived from the translation likelihood of the phrase and the corresponding translated phrase; and
    determining that the term and the corresponding translated term are synonyms using the assigned score of the synonym pair.

11. The method of claim 10, where the phrase is a search query from the query log.

12. The method of claim 8, further comprising:
    adding the query-snippet pairs to a parallel corpus; and
    training the statistical machine translation model using the plurality of query-snippet pairs in the parallel corpus.

13. The method of claim 8, further comprising:
    receiving an initial search query including one or more terms;
    determining that a first term in the search query occurs in a synonym pair of the one or more synonym pairs;
    in response to determining that the first term in the search query occurs in a synonym pair of the one or more synonym pairs, generating an expanded search query that includes a second term of the synonym pair;
    obtaining search results using the expanded search query to search a collection of documents; and
    providing the search results in response to the initial search query.

14. A system comprising:
    one or more computers and one or more storage devices storing instructions that are operable, when executed by the one or more computers, to cause the one or more computers to perform operations comprising:
    identifying a plurality of documents having one or more questions and, for each question, a corresponding answer;
    generating a plurality of question-answer pairs from the questions and respective corresponding answers occurring in the plurality of documents;
    training a statistical machine translation model using the plurality of question-answer pairs, including using each question of each question-answer pair as a source language input and a corresponding answer of the question-answer pair as a target language input, wherein each question and each corresponding answer are in the same natural language;

translating, using the statistical machine translation model trained on the plurality of question-answer pairs, a phrase into one or more corresponding translated phrases; and determining one or more synonym pairs by comparing the phrase with the one or more corresponding translated phrases.

15. The system of claim 14, wherein determining one or more synonym pairs comprises:

computing a translation likelihood for a phrase and a corresponding translated phrase;

generating a synonym pair from a term in the phrase and a corresponding translated term in the corresponding translated phrase;

assigning a score to the synonym pair, wherein the score is derived from the translation likelihood of the phrase and the corresponding translated phrase; and determining that the term and the corresponding translated term are synonyms using the assigned score of the synonym pair.

16. A system comprising:

one or more computers and one or more storage devices storing instructions that are operable, when executed by the one or more computers, to cause the one or more computers to perform operations comprising:

identifying a plurality of queries in a query log, and for each query, one or more search results associated with the query, wherein each search result identifies a corresponding resource and comprises a search result snippet that includes text from the corresponding resource identified by the search result;

generating a plurality of query-snippet pairs, wherein each pair associates a respective query of the plurality of queries with a particular search result snippet from one of the search results associated with the query in the query log;

training a statistical machine translation model using the plurality of query-snippet pairs, including using each query of each query-snippet pair as a source language input, and a corresponding snippet of the query-snippet pair as a target language input, wherein each query and the search result snippet of each query-snippet pair are in the same natural language;

translating, using the statistical machine translation model trained on the plurality of query-snippet pairs, a phrase into one or more corresponding translated phrases; and determining one or more synonym pairs including comparing the phrase with the one or more corresponding translated phrases.

17. The system of claim 16, wherein determining one or more synonym pairs comprises:

computing a translation likelihood for a phrase and a corresponding translated phrase;

generating a synonym pair from a term in the phrase and a corresponding translated term in the corresponding translated phrase;

assigning a score to the synonym pair, wherein the score is derived from the translation likelihood of the phrase and the corresponding translated phrase; and determining that the term and the corresponding translated term are synonyms using the assigned score of the synonym pair.

* * * * *